United States Patent [19]

Litherland

[11] Patent Number: 4,557,488

[45] Date of Patent: Dec. 10, 1985

[54] HYDRAULIC SEAL WITH PRESSURE-ACTUATED RIDGES

[75] Inventor: James A. F. Litherland, Sutton Coldfield, England

[73] Assignee: Hillman Newby Ltd., West Midlands, England

[21] Appl. No.: 701,939

[22] Filed: Feb. 15, 1985

[51] Int. Cl.[4] .......................... F16J 15/06; F16J 15/14
[52] U.S. Cl. ...................................... 277/27; 277/165; 277/208; 277/215
[58] Field of Search ..................... 277/3, 27, 139, 148, 277/155, 165, 201, 202, 207 R, 208, 214, 215

[56] References Cited

U.S. PATENT DOCUMENTS

| 3,305,241 | 2/1967 | Hart | 277/27 |
| 3,836,216 | 9/1974 | Junker | 277/27 X |
| 4,123,068 | 10/1978 | Van Gorder | 277/215 X |

FOREIGN PATENT DOCUMENTS

| 1814501 | 7/1970 | Fed. Rep. of Germany | 277/27 |
| 2124329 | 2/1984 | United Kingdom | 277/27 |

Primary Examiner—Robert S. Ward
Attorney, Agent, or Firm—Oldham, Oldham & Weber Co.

[57] ABSTRACT

An elastomeric seal (1), particularly for mining roof supports, has a circumferentially extending primary sealing ridge (4) for sealing against the cylinder wall (15) at both low and high pressure differentials. In order to provide lubrication of the primary sealing ridge, a series of fluid reservoirs (10) are defined adjacent to opposite sides of the primary sealing ridge by a respective web (5) of secondary sealing ridges, each web consisting of a circumferential ridge (6) and a series of axial ridges (7). The secondary ridges (6, 7) are dimensioned such that at low fluid pressure differentials across the piston there is a radial clearance between the secondary ridges and the cylinder wall, to reduce seal friction at low pressures, but at high pressure differentials the portion of the seal adjacent to the low pressure chamber is elastomerically deformed to bring the web of secondary ridges at that end into sealing engagement with the cylinder walls, to provide a secondary seal and to trap fluid in the reservoirs. The seal may be arranged to be single acting or double-acting.

5 Claims, 3 Drawing Figures

HYDRAULIC SEAL WITH PRESSURE-ACTUATED RIDGES

This invention relates to high pressure hydraulic seals particularly, but not exclusively, to piston seals for mining roof support assemblies used primarily in coal mines.

A typical mining roof support assembly comprises a vertical hydraulic cylinder, a piston rod extending through the upper end of the cylinder to engage the roof, and a piston attached to the lower end of the piston rod and carrying an annular seal to seal the piston to the cylinder wall. A pressure relief valve is connected to the cylinder space below the piston and is set to open at a predetermined pressure, dependent on the depth of the working, to permit minor settlement of the roof through slight downward movement of the piston and piston rod. For example, the relief valve may be set to open at 9,000 p.s.i. An annular pressure space is usually provided above the piston to assist in lowering the piston rod when the roof support is to be repositioned.

One problem associated with such piston seals when used in cylinders having good surface finishes and operating at high pressures is that in service the seal tends to wear very rapidly.

We believe that during long periods of lack of movement of the piston rod, hydraulic fluid tends to be expelled completely from the area of contact between the seal and the cylinder wall. This results in a substantial increase in seal friction, which is undesirable because the support becomes less sensitive to changes in roof loading. Also, parts of the seal may adhere permanently to the cylinder wall.

Also, we believe that when the mine roof begins to fall and the support is required to yield, as the seal is forced down the cylinder it pushes the fluid before it and consequently moves into an area of operation where it is not lubricated by the fluid.

The present invention stems from attempts to improve the lubrication of the sealing surface.

According to the invention a high pressure hydraulic piston seal comprises a substantially cylindrical elastomeric body provided with an integral circumferentially continuous, radially outwardly projecting, primary sealing ridge, and on one side of the primary ridge with a web of radially outwardly projecting secondary sealing ridges connecting with the primary ridge at a series of circumferentially spaced positions to define with the primary ridge a plurality of recesses on said one side of the primary ridge to act as fluid reservoirs, the radial height of the secondary ridges being chosen such that at low differential hydraulic pressures acting across the seal, in the direction from said primary ridge towards said one side, fluid in said reservoirs is in communication with the cylinder space on said one side of the seal by way of radial clearance between at least some of the secondary ridges and the cylinder wall, but that at high differential pressures acting in that direction the secondary ridges are pressed radially outwardly into firm sealing engagement with the cylinder wall through elastomeric deformation of the body to isolate the reservoir spaces from one another and from the pressure space on that other side.

Thus, fluid reservoirs are defined immediately adjacent to the primary sealing ridge to maintain lubrication of the primary ridge, and of the secondary ridges, at all times.

The primary sealing ridge is dimensioned to be a force fit within the cylinder so as to provide effective sealing between the piston and the cylinder wall at low pressures, but since the adjacent part of the seal body is relieved to provide the recesses, the area of the body which engages with the cylinder wall at high pressure differentials is kept to a minimum.

The web of secondary sealing ridges preferably comprises a series of circumferentially spaced substantially axially extending rdiges and a circumferentially continuous outer ridge, the axial ridges connecting at opposite ends with the outer ridge and with the primary ridge. The use of such axial ridges helps to reduce the frictional resistance to movement of the piston at high pressures which is desirable for controlled support of a mine roof.

The primary ridge and the outer ridge are preferably each plain circumferential ridges, but one or more of the ridges could be of undulatory form if desired.

Preferably the body is provided with an integral radially inwardly extending, circumferentially continuous further sealing ridge to effect a seal at low and high pressures between the body and the piston, the further rib preferably being located substantially in axial register with the primary ridge. Alternatively, or in addition, it would be possible to provide the piston surface with a radially outwardly extending circumferential ridge in axial register with the primary ridge.

Preferably a further web of secondary ridges is provided on the opposite side of the primary ridge to said web to provide the seal with a double-acting characteristic.

A seal for a mining roof support and in accordance with the invention will now be described by way of example only, with reference to the accompanying drawings in which.

The illustrated seal has been designed as a bi-directional high pressure seal, for convenience of assembly to a roof support device.

Figure 1:
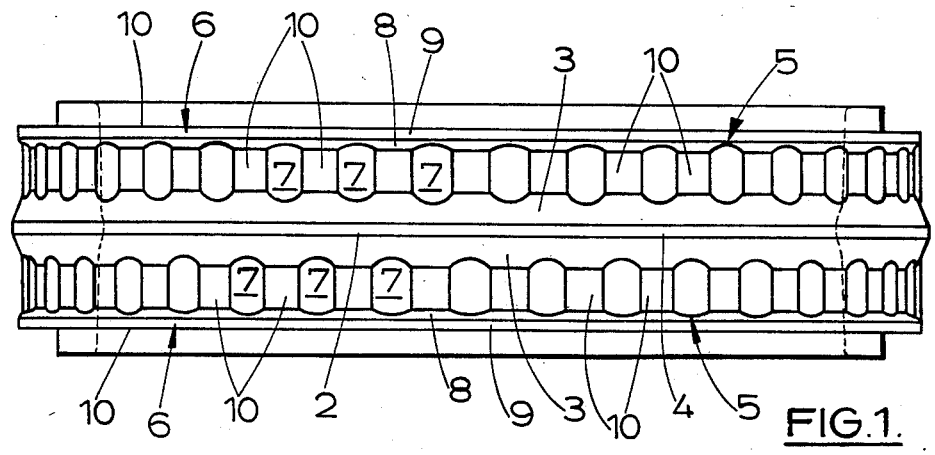
FIG. 1 is a side elevation of the seal in its free state.
Figure 2:
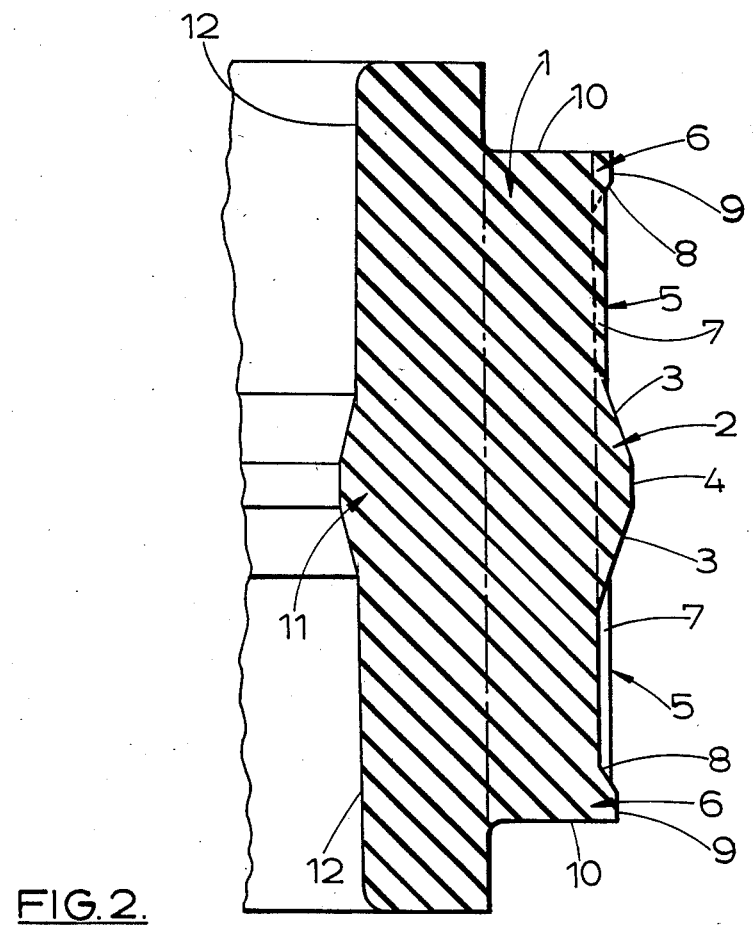
FIG. 2 is a radial cross-section on an enlarged scale of the seal in its free state.

With reference to FIGS. 1 and 2, the seal comprises a moulded rubber seal body 1 of substantially cylindrical shape provided with a centrally disposed, radially outwardly projecting, annular primary sealing ridge 2 defined by oppositely inclined frusto-conical ridge walls 3 and by a cylindrical ridge top 4. A respective web 5 of secondary sealing ridges is integrally provided on the radially outer surface of the body 1 on opposite axial sides of the primary ridge 2, and each web comprises a respective outer annular ridge 6 and a respective series of circumferentially equally spaced axial ridges 7.

Each outer ridge 6 is defined by a frusto-conical surface 8, a plain cylindrical surface 9, and by a radial face 22 of the adjacent stepped end of the body 1. The axial ridges 7 are of part-cylindrical outline and connect with the primary ridge 2 at their inner ends and with the respective outer ridge 6 at their outer ends. In the as-moulded, free state of the seal shown in FIGS. 1 and 2 the crests of the axial ridges 7 do not project radially outwardly as much as the surfaces 9 of the outer ridges 6, and the surface 4 of the primary ridge 2 projects radially substantially beyond surfaces 9.

Thus, on each side of the primary ridge 2 a respective series of circumferentially spaced radially outwardly facing recesses 10 are provided, each recess 10 being bounded by an adjacent pair of axial ridges 7, by the primary ridge 2, and by the respective outer ridge 6.

In FIGS. 1 and 2 the upper and lower ridges 7 are shown displaced angularly from one another but this is not of significance and was merely due to the particular moulding process employed where no control has been exerted over the relative orientations of the mould parts which provide the two series of ridges 7.

A central, annular further ridge 11 is provided integrally on the inside of the body 1 and in radial cross-section is of similar shape to primary ridge 2 but a little smaller. On opposite sides of the further ridge 11 the respective internal surfaces 12 of the body are substantially cylindrical but provided with a slight taper.

Figure 3:
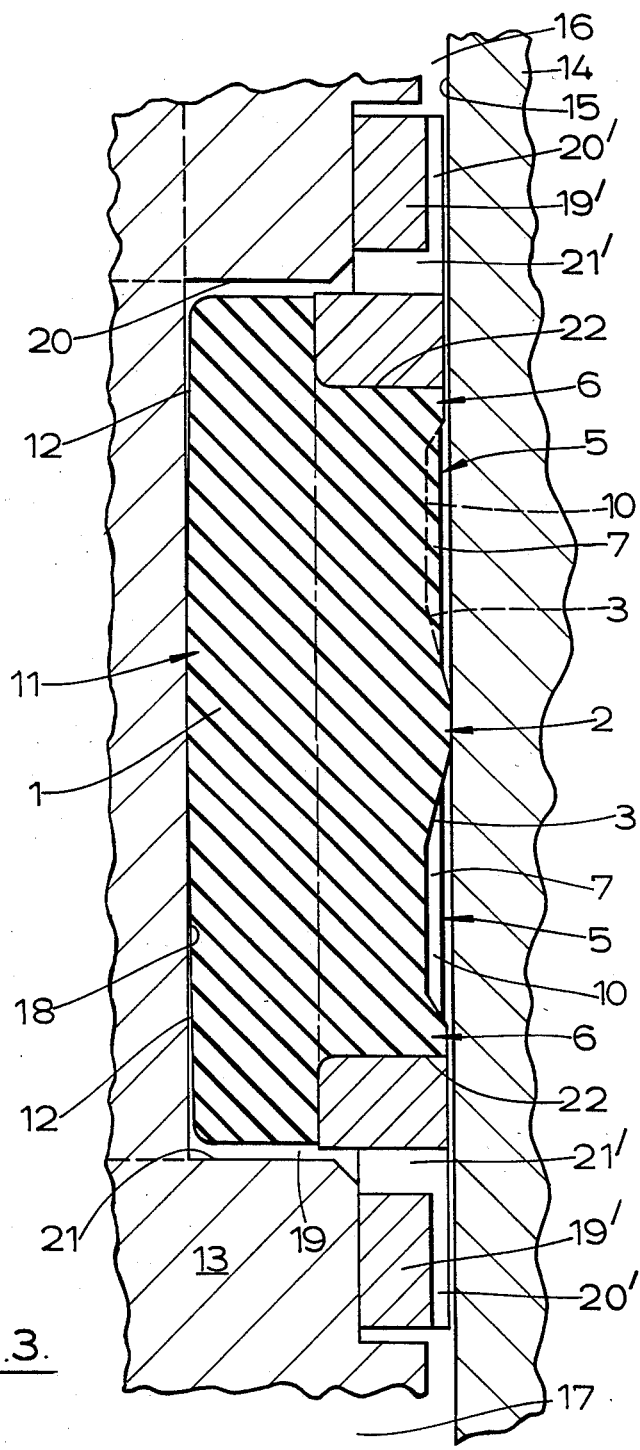
FIG. 3 is a radial cross-section of part of a piston and cylinder assembly showing the seal in use but subject to zero or low hydraulic pressure differential only.

FIG. 3 shows the seal of FIGS. 1 and 2 incorporated in the piston and cylinder assembly of a conventional mining roof support. Piston 13 is secured to the lower end of a piston rod, not shown, which extends sealably through the upper end of the cylinder 14 for engagement with the mine roof. The seal is fitted with axial clearance to an external recess 19 provided in the piston 13, and in its fitted condition on the piston prior to insertion in the cylinder it is stretched radially over its free state. A pair of annular anti-wear rings 19′ of L-shape in radial cross-section abut with opposite ends of the seal. On insertion of the piston 13 into the cylinder 14 the axially central part of the seal is compressed radially by engagement between the primary ridge 2 and the plain cylinder wall 15 so that the seal takes up the shape shown in FIG. 3 in which the outer ridges 6 are spaced slightly from the cylinder wall to permit fluid communication between the upper recesses 10 and the upper, annular cylinder chamber on the one hand, and between the lower recess 10 and the lower cylinder chamber 17 beneath the piston on the other hand.

Lower chamber 17 is provided with a conventional relief valve, not shown, which opens at a predetermined pressure to allow slight downward movement of the piston and thereby permit small movements of the mine roof. The precise setting of the relief valve will depend upon the circumstances of use, and in particular on the depth of the mine working.

It will be seen that in the condition of FIG. 3 in which substantially no hydraulic pressure is being applied to the piston the cylinder chambers 16 and 17 are sealed from each other by the sealing engagements between the base 18 of recess 15 and further ridge 11, and between primary ridge 2 and the cylinder wall 15. The resistance to sliding movement of the piston in this condition is minimal due to the low area of contact between the primary ridge 2 and the cylinder wall 15.

As is conventional, the hydraulic fluid employed in the roof support cylinder is water with a 5% soluble oil. On pressurisation of the lower chamber 17 to bring the piston rod to bear the roof weight, the seal body 1 is urged upwards relative to piston 13 by the pressure differential between chamber 17 and 16. The anti-wear rings 19′ are each provided with a series of four equiangularly spaced, axial recesses 20′ communicating with respective radial holes 21′ to provide fluid communication between the end of the seal and the respective adjacent chamber 16, 17. The upper end of the seal body is thereby forced against the upper end wall 20 of the piston recess 19 and the adjacent wear ring 19′ to confine the upper portion of the seal body and force the upper outer ridge 6 and the upper series of axial ridges 7 into sealing engagement with the cylinder wall 15, thereby providing additional areas of sealing between the seal body and the cylinder wall to trap pockets of fluid in the upper series of recesses 10, those recesses above the primary sealing rib 2. Thus, there are then two annular sealing surfaces, that of the primary ridge 2 and that of the upper outer ridge 6, between the high and low pressure chambers 17, 16 respectively. The surfaces 10′ between the axial ridges 7 are held clear of the cylinder wall by the ridges 6 and 7 to keep the seal friction to a minimum.

In the event of a tendancy of the roof to settle, the piston 13 will be urged downwards to increase the pressure further in chamber 17. The mechanical force of engagement between piston face 10 and the seal body will be increased to urge the upper ridge 6 and upper series of ridges 7 more firmly into engagement with cylinder wall 15. Thus, during downward movement of the piston 13 under these circumstances, as permitted by opening of the pressure relief valve connected to lower chamber 17, the primary sealing ridge 2 moves onto portions of the cylinder wall previously exposed to the lower series of reservoir spaces 10 and therefore lubricated. The upper outer ridge 6 moves onto cylinder wall portions which are lubricated by the fluid in the upper series of spaces 10.

Since the frictional resistance between the seal and the cylinder wall is reduced by the lubrication of the seal, and by the reduced total area of seal contact as compared with conventional seals, the support is more sensitive to roof movement.

When it is desired to lower the piston rod, in order to advance or remove the roof support, the upper chamber 16 is pressurised to urge the piston downwardly, the primary ridge 2 providing an adequate seal against the low reverse pressure differential.

In the event of damage to one or more portions of the upper or lower ridges 6, the entire sealing effectiveness of that ridge 6, to maintain fluid in recesses 10 and prevent contact of the respective surface 10′ with the cylinder wall, will not be lost, since when that ridge is performing a sealing function the spaces 10 bounded by that ridge are sealed from one another, so that most spaces 10 will be isolated from the damaged portion of ridge 6.

It will be appreciated that the illustrated seal has been made substantially symmetrical about its central radial plane so that its performance does not depend upon its orientation during assembly, which will often be performed in dark conditions. Of course the illustrated seal may be used to advantage in situations requiring a bi-directional seal at high pressure differentials.

I claim:

1. A high pressure hydraulic piston seal for sealing a piston to the wall of a cylinder comprising a substantially cylindrical elastomeric body provided with an integral circumferentially continuous, radially outwardly projecting, primary sealing ridge, and on one side of the primary ridge with a web of radially outwardly projecting secondary sealing ridges connecting with the primary ridge at a series of circumferentially spaced positions to define with the primary ridge a plurality of recesses on said one side of the primary ridge to act as fluid reservoirs, the radial height of the secondary ridges being chosen such that at low differential hydraulic pressures acting across the seal, in the direction from said primary ridge towards said one side, fluid in said reservoirs is in communication with the cylinder space on said one side of the seal by way of radial clearance between at least some of the secondary ridges and the cylinder wall, but that at high differential pressures acting in that direction the secondary ridges are pressed radially outwardly into firm sealing engagement with the cylinder wall through elastomeric deformation of the body to isolate the reservoir spaces from one another and from the pressure space on that other side.

2. A piston seal as claimed in claim 1 in which the web of secondary sealing ridges comprises a series of circumferentially spaced substantially axially extending ridges and a circumferentially continuous outer ridge, the axial ridges connecting at opposite ends with the outer ridge and with the primary ridge.

3. A piston seal as claimed in claim 2 in which the primary ridge and the outer ridge are each plain circumferential ridges.

4. A piston seal as claimed in claim 3 in which the body is provided with an integral radially inwardly extending, circumferentially continuous further sealing ridge to effect a seal at low and high pressures between the body and the piston, the further rib preferably being located substantially in axial register with the primary ridge.

5. A piston seal as claimed in claim 4 in which a further web of secondary ridges is provided on the opposite side of the primary ridge to said web to provide the seal with a double-acting characteristic.

* * * * *